United States Patent

Vogt

[15] 3,640,306
[45] Feb. 8, 1972

[54] PRESSURE RELIEF VALVE
[72] Inventor: Clarence L. Vogt, Burbank, Calif.
[73] Assignee: Bobrick Aero Missile Products, North Hollywood, Calif.
[22] Filed: Oct. 19, 1970
[21] Appl. No.: 81,646

[52] U.S. Cl. ............................137/512.1, 137/527, 137/529
[51] Int. Cl. .................................................F16k 15/03
[58] Field of Search ..................137/512.1, 529, 527, 527.2, 137/527.4, 527.6, DIG. 7

[56] References Cited

UNITED STATES PATENTS

| | | | |
|---|---|---|---|
| 2,976,882 | 3/1961 | Cowan | 137/527.4 |
| 3,059,624 | 10/1962 | Torre | 137/512.1 |
| 3,095,178 | 6/1963 | Veber | 137/512.1 |

Primary Examiner—Samuel B. Rothberg
Assistant Examiner—William H. Wright
Attorney—Mahoney, Hornbaker & Schick

[57] ABSTRACT

A multiflapper relief valve wherein individual flapper valve members are sector shaped laying in a common plane and rotatable through an arc from the closed or seated position to the open position and wherein each of the flapper valve members are provided with a cricket spring of the leaf-type to preload them to a selected value, which value must be overcome by fluid in the system in which the relief valve is used in order to unseat the valve members. When the fluid pressure in the system is greater than the cracking pressure, unseating occurs and the cricket spring thereafter exerts a substantially insignificant, lower force in comparison once the flapper valve member is moved off of its seat and imparts a snap opening and closing action to each of the sector-shaped valve members.

11 Claims, 5 Drawing Figures

PATENTED FEB 8 1972 3,640,306
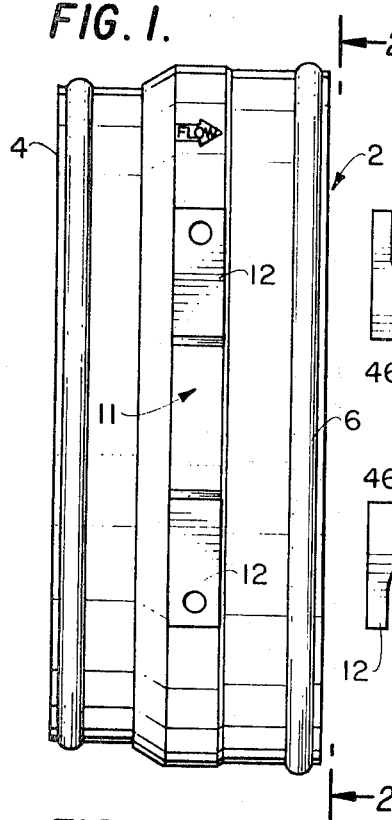
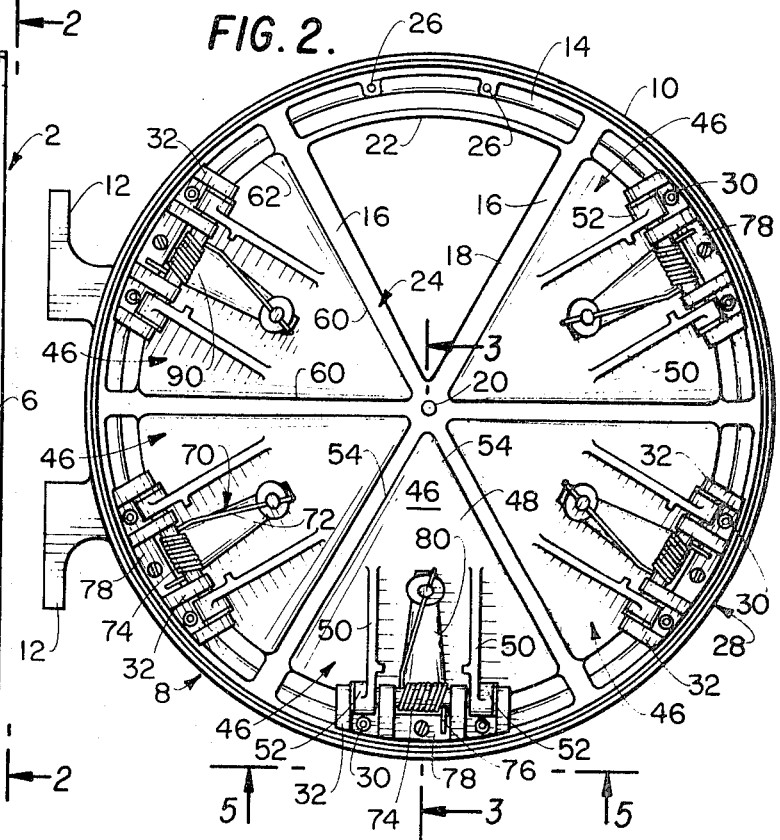
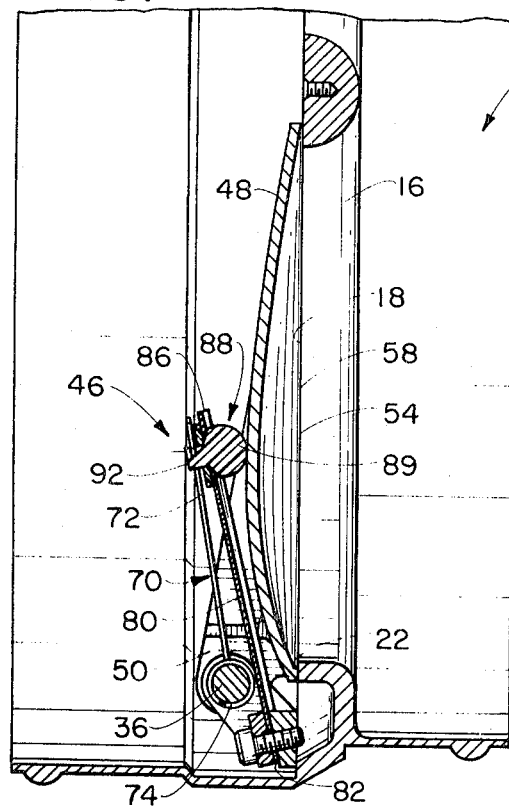
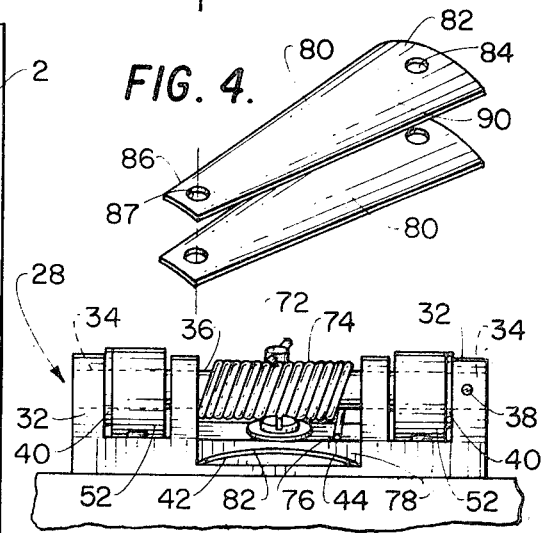
INVENTOR.
CLARENCE L. VOGT
BY MAHONEY, HORNBAKER
AND SCHICK
ATTORNEYS

PRESSURE RELIEF VALVE

BACKGROUND OF THE INVENTION

In a broad sense, this invention is directed to an improved valve member structure, similar in some respects, to the invention and CHECK VALVE disclosed in U.S. Pat. No. 2,976,882 issued Mar. 20, 1961. That invention, like this one, relates to a pressure relief valve or check valve for fluid transmission systems and more particularly to a valve structure adapted to be utilized in conduits conducting high-temperature, high-pressure air to prevent backflow through said conduits wherein the valves do not operate until a certain preselected pressure has been reached.

The utilization in present-day aircraft of large volumes of high-temperature air for air-conditioning and heating purposes involves the use of check valves designed to prevent backflow from the conduits through which the air is transmitted so that reverse flow through the system cannot take place. Oftentimes, in these systems, it is desirable to have the valves remain in the closed position until a preselected fluid pressure is attained and then to have the valves open in as rapid a manner as possible to act, so to speak, through a "dumping" action.

Conventional valves of the check and pressure relief type have generally necessitated a poppet-type mechanism utilizing a compression spring designed so that the poppet displacement is in proportion to the pressure differential in order to have a quick acting valve. In this type of valve, the fluid "bleeds" as opposed to "dumps" such that the valve is not in reality of the quick acting type. In this type of poppet valve, the mechanism will not provide rapid opening, especially where large flows are required, thereby necessitating a special complicated triggering mechanism which adds to the cost and creates burdensome maintenance procedures required to insure proper action and operation.

The herein disclosed invention, adopts in many respects, the general desirable attributes of the check valve disclosed in the aforementioned patent to provide a smaller envelope and lower weight for a given duct size. In the poppet-type valve, additional flow area must be provided so that air can flow around the poppet, but in the herein disclosed invention air can flow straight through the center of the multiflapper pressure relief valve. Additionally, greater flow for a given pressure is possible because extremely low-pressure drops will result from the straight through flow of a multiflapper pressure relief valve of the type disclosed herein, contrary to the disturbed flow of the poppet type or, for that matter, the single- or double-flapper-type valve. Additionally and more specifically, the combination of a negative rate spring of the leaf or cricket type permits rapid opening of the pressure relief valve once a preselected pressure in the system has been attained. Rapid depressurization or "dumping" of fluid within the conduit in which the valves of this invention are used, is thereby readily obtained.

OBJECTS AND SUMMARY OF THE INVENTION

It is an object of this invention to provide a pressure relief valve for use in fluid ducts which is characterized by its selective response to changes in conditions in the system in which it is utilized.

It is another object of this invention to provide a multiflapper valve for use in fluid systems wherein the flappers are not operative until a preselected cracking pressure is reached.

It is still a further object of this invention to provide a pressure relief valve of the flapper type wherein a leaf spring acts upon each of the flapper valve members to exert a substantially high force thereon while said flapper valve member is in the closed position and exerts, in comparison, a relatively low insignificant force when the valve member is in the open position.

It is still a further object of this invention to provide a multiflapper pressure relief valve wherein each of the flapper members are sector shaped and because of a cricket spring, has a snap closing and opening feature providing for rapid opening of the valve member.

It is still a further object of this invention to provide a pressure relief valve employing a plurality of sector-shaped flapper valve members for use in air conduits wherein the valve members are not immediately responsive to fluid flow therein and a predetermined and preselected cracking pressure must be attained before the valve operates in a rapidly responsive manner to thereby permit dumping of the air as opposed to bleeding thereof through said valve members.

Other objects and advantages of the invention will be apparent from the following specification and accompanying drawing, which is for the purpose of illustration only.

Basically, in an exemplary embodiment, the invention pertains to a pressure relief valve of the flapper type wherein the flapper is pivotally mounted and movable through an arc from a closed and seated position to an open position, the improvement comprising the combination of said flapper and spring means to exert a substantially high force on said flapper during the movement thereof through a finite arc segment proximate the closed position thereof and a relatively low in comparison constant force through the remainder of the arc of movement and to effect a snap closing and opening action of said flapper when moved through said arc segment.

BRIEF DESCRIPTION OF THE DRAWINGS

FIG. 1 is a side elevational view showing the exterior of a fluid conduit member in which the valve of the present invention may be utilized;

FIG. 2 is a view taken along the line 2—2 of FIG. 1 showing the multiflapper pressure relief valve of this invention; with one flapper removed for purposes of clarity;

FIG. 3 is a view, partially in cross section, taken along the line 3—3 of FIG. 2;

FIG. 4 is an enlarged, fragmented view of a spring member that may be used in conjunction with the pressure relief valve shown in FIG. 2; and FIG. 5 is a view taken along the line 5—5 of FIG. 2, with the enclosing walls omitted for purposes of clarity.

DESCRIPTION OF THE BEST EMBODIMENTS CONTEMPLATED

Referring to the drawing wherein like numerals of reference designate like elements throughout, a specific embodiment of the invention is illustrated and will be described, but it should be apparent at the outset that specific details such as, for example, the number of individual flapper valve members or sectors as well as their configuration, are matters of choice and thus, the invention may be practiced in a myriad of modes other than that depicted.

A fluid conduit section generally designated 2 and herein used for the transmission of air has inlet 4 appropriately shaped and adapted to be received by an extending tubular conduit (not shown) and an outlet 6 similarly adapted to be engaged by a fluid conduit, likewise not shown. Intermediate the inlet 4 and outlet 6 is the pressure relief valve structure of this invention generally designated 8. The conduit section 2, as well as valve structure 8 may be integrally formed of thin wall configuration and suitably made of metals, particularly those that are of lightweight and high strength, suitable for use in, for example, aircraft air-conditioning systems. Pressure relief valve structure 8 comprises generally annular valve member support portion 10 in this instance, having on its exterior surface 11 secured and opposed brackets 12 by which means conduit section or segment 2 may be secured in a fluid line by securement to structural framing of an aircraft or the like.

Consistent with the lightweight design criterion, generally associated with aircraft usage, annular portion 10 comprises circumferential web 14 providing mounting areas as will be described, having spaced intersecting raylike seating bars 16, which are here shown as having flat seating surfaces 18, but which like the radial bars disclosed in said aforementioned patent, may be of air foil or substantially semieliptical cross-sectional configuration with the apex of the semielipse facing in the direction of fluid flow. In this instance the six seating bars 16 are joined at the center 20 and provide, in conjunction with integrally formed, radially inset curvilinear seating bars 22, a plurality of valve seats 24 each spaced between adjacent intersecting crossbars 16 and the inset arcuate bar 22 included within each of the sectors defined by adjacent intersecting crossbars.

Each pair of mounting portions 26 of portion 10 supports a mounting bracket 28 by means of, for instance, machine screws 30. Each bracket 28 has two pairs of adjacently positioned mounting arms 32 having aligned holes 34 therethrough to receive hinge pin 36 in retained relationship as by means of, for example, cotter pin 38 with appropriate Teflon or nylon washers 40 being provided for their usual purposes as will be apparent. The intermediate web or span 42 of bracket member 28 is provided with arcuate portion 44 for reasons which will become apparent.

Mounted on each bracket member 28 by means of hinge pin 36 is a pivotally mounted flapper valve member, generally designated, 46 having a generally triangular, pie-shaped portion 48 and having integrally formed bifurcated arm portions 50 by which means pivotal securement of flapper valve member 46 to hinge pin 36 of bracket 28 is obtained. The end portions 52 of arm members 50 are of appropriate size and shape to be received within spaced portions 32 of bracket 28 and have through bores sufficient in size to accommodate hinge pin 36.

The flapper valve members 46 are each sector shaped and each is provided with arcuate and beveled outer edges as at 54. Each of the valve members 46 is provided with a continuous sealing face 58 which includes two straight legs 60 and an arcuate leg 62, the straight legs 60 being engageable with the radial bars 16 on opposite sides of the valve member 46 and the arcuate leg 62 being engageable with the included inset arcuate bar 22 of support portion 10. Thus, the valve members 46 are mounted in coplanar fashion with each other so as to effect fluidtight, seating engagement with the seats 24 formed by radial crossbars 16 and the coplanar arcuate bars 22.

In this instance, each of the valve members 46 are primarily spring-biased into the closed position, as shown in FIG. 3, by main spring 70 having an extending portion 72 and a coiled portion 74 looped around hinge pin 36 with the extreme end 76 engaging the upper surface of clamp member 78. The force of spring 72 as indicated, maintains each of the flapper members 46 in the seated or closed position and exerts a substantially constant closing force to maintain the valve members 46 in the seated position.

However, and in keeping with the essence of the invention, a leaf or cricket spring 80 of trapezoidal or rectangular configuration and having an arcuate shape in cross section, is secured by means of the clamp member 78 securing in cantilever fashion the end 82 of leaf spring 80 to exert a force on the upper surface of each of the valve members 46. To this end, an aperture 84 is provided in the end 82 so that the screw-secured clamp means 78 may maintain spring 80 in a secure manner on the arcuate mounting surface 44 of bracket member 28. The arcuate surface 44 helps retain the arcuate cross-sectional configuration of one or more leaf springs 80 secured thereon. The demountability of clamp 78, by simply removing a single screw permits ready changing of the forces acting upon each of the valve members 46. Thus, merely by adding or subtracting leaf springs 80 or by varying their physical characteristics, a preselected and variable pressure relief valve is obtained. Other means of retaining the cricket spring are contemplated.

The extreme tapered end 86 of spring 80 is also provided with an aperture 87 to which is secured a support button or member, 88 made of, for example, nylon, Teflon or other material and having a lower, spherical contacting portion 89 and an upper cylindrical securement end 92 through which the free end of spring 72 projects in order to securely retain support button 88 to leaf spring 80. Other means of securement are also contemplated.

The leaf spring 80 is selected for its degree of flexibility or deflection in a transverse axis, as at 90, near the end 82 and may be used in singular or plural form depending upon the end results desired. In other words, as earlier indicated, the leaf springs 80 may be varied to selectively vary the load exerted on each of the valve members 46. Because the springs 80 are of spring steel and of rather thin gauge, they act as true cricket or negative rate springs so that they deflect or bend in an opposite direction from their normal configuration at or near their place of securement as at 90.

Thus, a pair of leaf springs of the general configuration shown in FIG. 4, having a length of about 2½ inches; a width at the secured end 82, of about three-fourths inch, and a width at the opposite end 86 of about one-half inch and a thickness or gauge of about 0.003 inch, will exert sufficient force on a valve member 46 such that a cracking pressure for a 9½ inches valve assembly such as that shown will be between a minimum of 3.0 inches $H_2O$ and a maximum of 3.5 inches $H_2O$.

The significant fact is that the spring 80 in a sense preloads each of the valve members 46 such that a minimum force of fluid is required to cause each of the valve members 46 to unseat and when this minimum pressure is attained and unseating occurs, the force exerted by the leaf springs 80 diminishes substantially in comparison to the force initially exerted to the point where the only force acting on each of the valve members 46 tending to return it to the closed or seated position is that force exerted by the spring end 72.

Thus, assuming a 90° (from vertical as seen in FIG. 3) arc segment through which each flapper member moves from the closed to the full open position, the cricket spring 80 exerts a substantially high force during movement of the flapper valve member 46 proximate the closed or seated position and a relatively low, insignificant force through the remainder of movement through the arc segment. The deflection or buckling of the leaf spring as at 90 causes the valve members 46 to attain a snap closing or snap opening action thereby permitting the valve to operate as a "dump" or immediately responsive valve to allow the individual, pivotally mounted flapper valve members 46 to be almost instantaneously responsive and allow fluid flow through the valve.

While the drawings have illustrated and the specification has described a pressure relief valve wherein a constant force spring such as 72 and a negative rate spring such as 80 have been used in combination it is, of course, possible, and in some instances, desirable, to dispense with the constant force spring 72 and utilize the cricket spring 80 either singularly or in a stacked manner to achieve the salient features of the invention. Additionally, while a trapezoidallike cricket spring has been shown, a true rectangular shape as well as other polygonal shapes may suffice and may be found to be desirable under some circumstances.

The pressure relief valve may utilize one or more flapper valve members or sectors, even or odd-numbered, without detracting from the attributes of the pressure relief valve member disclosed herein. Furthermore, while the main component of the valve member has been illustrated as being integral with a conduit section or segment, it may be made otherwise and these as well as other matters are within the skill of the art and will not detract from the essence and spirit of the invention as defined by the appended claims.

I claim:

1. In a pressure relief valve of the flapper type, wherein said flapper is pivotally mounted and movable through an arc from a closed and seated position to an open position, the improvement which comprises: the combination of said flapper and spring means to exert a substantially high force on said flapper during the movement thereof through a finite arc segment proximate the closed position thereof and a relatively low, in comparison constant force during the remainder of the arc of movement thereof and to effect a snap closing and opening action of said flapper when moved through said finite arc segment.

2. The improvement in accordance with claim 1 wherein said spring means is deflectable through the transverse axis thereof to obtain said snap action.

3. The improvement in accordance with claim 2 wherein said spring means is a strip of spring metal of relatively small thickness sufficient to permit flexing thereof.

4. The improvement in accordance with claim 3 wherein said strip is of arcuate configuration in transverse cross section.

5. The improvement in accordance with claim 4 wherein said strip is trapezoidallike in shape and is supported cantilever fashion from the secured end of said flapper.

6. The improvement in accordance with claim 4 which additionally includes a torsion spring, one end of which acts upon the extremity of said strip opposite the secured end thereof.

7. The improvement in accordance with claim 6 which additionally includes a flapper contact member which is secured to said extremity of said strip and which transmits the force of said spring to said flapper.

8. The improvement in accordance with claim 7 wherein said flapper contact member is secured to said strip by said one end of said torsion spring.

9. The improvement in accordance with claim 8 which includes additional spring steel strips of like size and configuration as said spring means and mounted therewith in spring leaf fashion.

10. The improvement in accordance with claim 9 wherein said flapper is sector shape and a plurality of said flappers of pie-shaped configuration are disposed in coplanar relationship onto coplanar seating surfaces.

11. A multiflapper valve comprising an annular flapper support and seat member adapted to be received in a fluid conduit and being divided by intersecting seating bars into a plurality of sectors to form a plurality of valve seats, corresponding in number to said sectors; a flapper valve member pivotally mounted to said support and seat member in each of said sectors and being movable through an arc segment from a closed seating position with said valve seat to an open nonseating position; a cantilever supported spring member supported on each of said flapper valve members, said spring member being a flexible leaf capable of deflection in a direction substantially transverse to the longitudinal axis thereof to exert a substantially high force on said flapper valve member in the seated position and a relatively low, in comparison, force when said flapper valve member is in the unseated position.

* * * * *